United States Patent [19]
Watanabe

[11] Patent Number: 5,873,687
[45] Date of Patent: Feb. 23, 1999

[54] TOOL UNIT WITH HYDRAULIC FEED PASSAGE

[75] Inventor: Michio Watanabe, Irving, Tex.

[73] Assignee: Mori Seiki Co., Ltd., Nara, Japan

[21] Appl. No.: 840,772

[22] Filed: Apr. 16, 1997

[51] Int. Cl.⁶ ............................................. B23D 7/00
[52] U.S. Cl. ................. 409/234; 279/4.01; 279/155; 408/59; 409/135
[58] Field of Search ................................. 409/135, 136, 409/137, 232, 233, 234; 408/56, 57, 59; 279/141, 155, 4.01

[56] References Cited

U.S. PATENT DOCUMENTS

| | | | |
|---|---|---|---|
| 3,130,978 | 4/1964 | Van Roojen | 279/141 |
| 3,911,718 | 10/1975 | Requarth | 72/342 |
| 3,989,260 | 11/1976 | Zonkov et al. | 279/4.01 |
| 4,325,664 | 4/1982 | Mori | 409/234 |
| 4,795,292 | 1/1989 | Dye | 409/234 |
| 4,818,161 | 4/1989 | Cook | 409/233 |
| 4,877,360 | 10/1989 | Pfalzgraf | 409/234 |
| 4,929,131 | 5/1990 | Allemann | 409/232 |
| 4,981,403 | 1/1991 | Katayama | 409/136 |
| 5,061,129 | 10/1991 | Blaudermann | 409/234 |
| 5,140,739 | 8/1992 | Yamaguchi et al. | 483/18 |
| 5,163,790 | 11/1992 | Vig | 408/57 |
| 5,280,671 | 1/1994 | Marquart | 409/234 |
| 5,319,886 | 6/1994 | Steere, Jr. | 409/234 |
| 5,378,091 | 1/1995 | Nakamura | 408/57 |
| 5,593,258 | 1/1997 | Matsumoto et al. | 409/234 |

FOREIGN PATENT DOCUMENTS

| | | | |
|---|---|---|---|
| 015248 | 9/1980 | European Pat. Off. | 409/135 |
| 348168 | 12/1989 | European Pat. Off. | 279/4.01 |
| 4033607 | 4/1992 | Germany | 409/234 |
| 2-218552 | 8/1990 | Japan . | |

Primary Examiner—Andrea L. Pitts
Assistant Examiner—Christopher Kirkman
Attorney, Agent, or Firm—Griffin, Butler Whisenhunt & Szipl, LLP

[57] ABSTRACT

A tool unit according to the invention has an arrangement wherein a shaft-like mount portion having a step is disposed on one of a tool body or a tool holder. The other of the tool body or the tool holder, includes a recessed fitting portion or bore shrinkage-fitted on the mount portion and having a step. The fitting portion includes a hydraulic feed passage for externally feeding a high-pressure oil to a gap defined between the step of the mount portion and the step of the fitting portion. In mounting the tool body to the tool holder, the high-pressure oil is externally fed to the gap through the hydraulic feed passage. Thus, a thin layer of the high-pressure oil is formed between the shrinkage-fitted surfaces, while on the other hand, the tool body and the tool holder are drawn close to each other. This facilitates the correction of inclination or axial displacement of the fitting portion relative to the mount portion, which occurred during the shrinkage-fit process. Additionally, feeding the high-pressure oil to the gap allows the tool body to be readily dismounted from the tool holder.

20 Claims, 8 Drawing Sheets

TOOL UNIT WITH HYDRAULIC FEED PASSAGE

BACKGROUND OF THE INVENTION

1. Field of the Invention

The present invention relates to a tool unit comprising a tool holder and a tool body mounted thereto. The tool unit is disengageably retained by a spindle of a machine tool or the like. More particularly, the invention relates to a tool unit featuring high rigidity and enabling the tool body to be fixed to the tool holder with high precision.

2. Description of the Background Art

Machine tools, such as machining centers and the like, require automatic change of tools because a workpiece is typically subjected to different machining processes. Accordingly, such machine tools are arranged such that a variety of tool units are previously accommodated in a tool magazine and fed to an automatic tool changer. The tool changer, in turn, replaces a tool unit mounted to a spindle of a machine tool with another tool unit from the tool magazine. Each such tool unit comprises a tool holder with a common shank portion to be disengageably secured to the spindle, and a tool body mounted to the tool holder.

Various modes of mounting the tool body to the tool holder of the tool unit, in addition to a typical collet chuck system, are known in the art. In a mode shown in FIG. 8, for example, a tool holder 71 and a tool body 74 are fixed to each other by means of fixing means, such as a bolt 77. The tool holder 71 has an end surface 72 abutted against an end surface 75 of the tool body 74. A protrusion 73 formed on the end surface 72 of the tool holder 71 is fitted in a recess 76 formed in the end surface 75 of the tool body 71. In a mode shown in FIG. 9, a tapered bore 85 formed in a tool body 84 is tightly fitted on a tapered portion 82 of a tool holder 81. The tool body 84 is firmly secured to the tool holder 81 by means of a nut 86 firmly screwed on an external thread 83 extending from an end surface of the tapered portion 82 of the tool holder 81.

Recently, grinding tools and cutting tools have made dramatic progress. For example, CBN tools and diamond tools, such as end mills, grinding wheels and the like, employ edges or abrasive grains formed of CBN (cubic boron nitride) or diamond which are capable of cutting or grinding workpieces through superfast rotation. In this connection, the machine tools are adapted to rotate their spindles at extremely high speeds. Therefore, unless the CBN tool bodies are mounted with high precision to the tool holders, the CBN tools will suffer serious damage by running out of the tool bodies during superfast rotation. This hinders the inherent performance CBN tools.

Unfortunately, it is difficult for the aforementioned collet chuck system to assure high precision mounting of the tool body to the tool holder. Furthermore, because of its mechanism, the system suffers a risk of loosening between the tool holder and the toll body during fast rotation.

In the mode of FIG. 8, a gap is formed at the fitting portion of the tool holder and the tool body, resulting in the tool body running out from the tool holder to a higher degree. It is also difficult in this embodiment to form the end surfaces perpendicular to the axis of the tool.

As to the mode of FIG. 9, it is difficult to fabricate the tool holder and tool body in such a manner as to minimize the running out of the tapered portion and blade edge and to maintain constant axial dimensions.

The running out of the tools would be eliminated by integrally forming the tool body and the tool holder. However, providing a tool unit integrating the tool body and tool holder, and fabricating tool unit for each tool of a different configuration, results in increased overall production costs. In case of failure, the whole tool unit must be replaced, which results in increased replacement costs.

Alternatively, the tool body may be mounted on the tool holder by means of a shrinkage-fit method, as disclosed in U.S. Pat. No. 4,818,161. The shrinkage-fit method comprises the steps of, for example, (1) forming a shaft-like mount portion on the tool body and forming a fitting portion in the tool holder, wherein the fitting portion includes a fitting bore with a diameter slightly smaller than that of the mount portion; (2) heating the fitting portion to cause expansion of the fitting bore and then pressing the mount portion into the fitting portion; and (3) cooling the fitting portion to cause contraction of the fitting bore thereby establishing a shrinkage-fit between the mount portion and the fitting portion. The tool body and the tool holder are thus firmly secured to each other, and can assure a run-out precision close to that of a tool unit in which the tool body and tool holder are integrated.

Unfortunately, shrinkage-fitting the tool body on the tool holder results in a cumbersome process for mounting/dismounting the tool body to/from the tool holder. In addition, the tool body may be shrinkage-fitted on the tool holder as inclined or axially displaced relatively to the tool holder.

SUMMARY OF THE INVENTION

In view of the foregoing, it is an object of the present invention to provide a tool unit providing easy mounting/dismounting of a tool body to/from a tool holder as well as minimizing the running out of the tool body from the tool holder.

In accordance with the above objects, the present invention provides a tool unit comprising a tool holder and a tool body. The tool holder includes a smaller diameter portion, a larger diameter portion adjacent the smaller diameter portion, and a step between the larger and smaller portions. The tool body is constructed to be fit to the tool holder and includes a smaller diameter portion constructed to engage the smaller diameter portion of the tool holder, a larger diameter portion for engagement with the larger diameter portion of the tool holder, and a step defined between the smaller and larger diameter portion of the tool body. A draw mechanism is constructed to draw the tool holder and tool body together, and a predetermined gap is defined between the step defined on tool holder and the step defined on the tool body when the tool body is mounted on the tool holder. Lastly, a hydraulic feed passage is provided intercommunicating the predetermined gap and an outside of the tool unit.

Either one of the tool holder or the tool body is constructed to be shrink fit on the other.

The tool unit according to the present invention comprises a tool holder disengageably retained by a spindle of a machine tool and including a shaft-like mount portion having a small diameter at a distal end, a greater diameter at a proximal end, and a step defined between the small and greater diameters. A tool body is mounted to the tool holder and includes a fitting portion shrinkage-fitted on the mount portion of the tool holder. The fitting portion includes a first fitting bore fitted on the small diameter of the mount portion. A second fitting bore is fitted on the great diameter of the mount portion. A step is defined between the first and second fitting bores. A draw mechanism is provided for drawing the tool holder and the tool body mounted thereto close to each other. The tool holder and tool body have regulation surfaces abutted against each other for regulating a degree of fitting of the tool holder and tool body so as to define a predetermined gap between the step of the mount portion and the step of the fitting portion. Lastly, the fitting portion includes a hydraulic feed passage intercommunicating the gap and the outside for feeding a pressure oil to the gap.

According to the invention, when the fitting portion of the tool body is shrinkage-fitted on the mount portion of the tool holder, the regulation surfaces of the tool body and tool holder abut against each other such that a predetermined gap is formed along the overall circumference between the steps of the fitting portion and mount portion.

If a high-pressure oil is externally fed through the hydraulic feed passage formed in the fitting portion when the tool body and tool holder are drawn close to each other by means of the draw mechanism, a thin layer of the high-pressure oil is formed between the fitting surfaces of the fitting portion and mount portion. This oil layer serves as a lubricant for facilitating the correction of inclination and axial displacement of the tool body relative to the tool holder, if inclination and axial displacement occur during the shrinkage-fit process. This substantially eliminates the run-out of the tool body from the tool holder.

In the tool unit with the tool body already mounted to the tool holder, when the tool body and tool holder are released from the draw mechanism and high-pressure oil is fed to the gap via the hydraulic feed passage, the oil thus supplied pushes end surfaces of the steps of the tool holder and tool body in opposite directions. Hence, the tool body is readily dismounted from the tool holder.

The aforementioned tool unit also has an arrangement wherein the tool holder includes the shaft-like mount portion and the tool body includes the fitting portion. Inversely, a similar effect to the above may be achieved by an arrangement wherein the tool body includes the shaft-like mount portion and the tool holder includes the fitting portion.

Further objects, features and advantages of the present invention will become apparent from the Detailed Description of the Preferred Embodiments, which follows, when considered together with the attached drawings.

DESCRIPTION OF PREFERRED EMBODIMENTS

Figure 1:
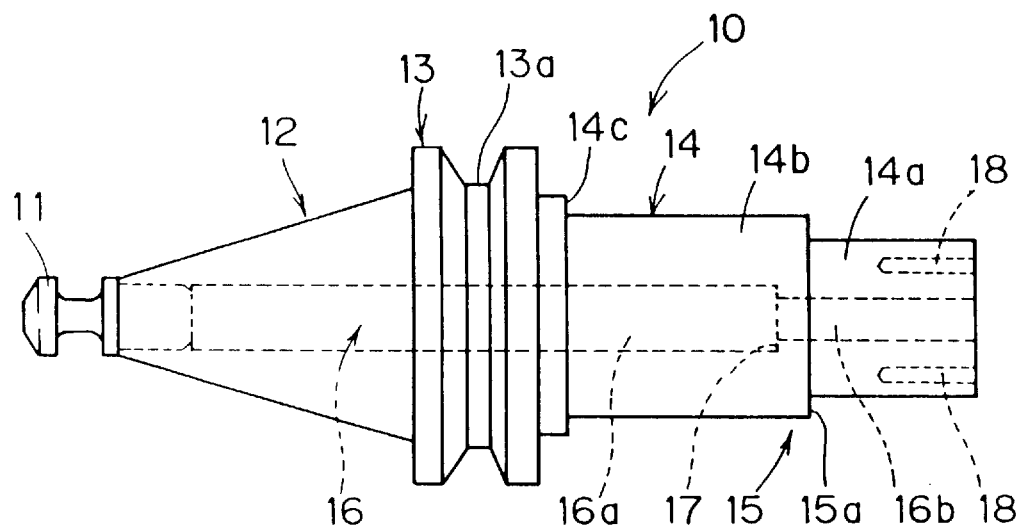
FIG. 1 is a top plan view showing a tool holder according to a first embodiment of the invention.

Preferred embodiments of the invention will be described hereinbelow referring to the attached drawings in which like parts are given like reference numerals. FIGS. 1 to 4 depict a first embodiment of the invention. As seen in the figures, a tool unit 1 of the invention comprises a tool holder 10 disengageably retained by a spindle of a machine tool, a tool body 20 mounted to the tool holder 10, and a draw mechanism 30 for drawing the tool holder 10 and the tool body 20 mounted thereto close to each other.

Figure 2:
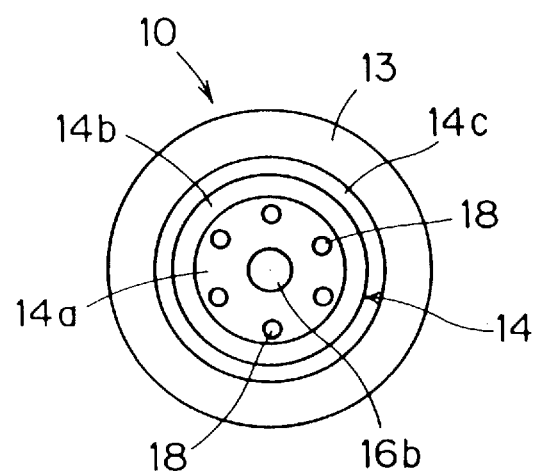
FIG. 2 is an end view showing a mount portion of the tool holder of FIG. 1.

As seen in FIGS. 1 and 2, the tool holder 10 comprises a tapered shank 12 fitted in a tapered bore formed in the end portion of a spindle of a machine tool (not shown), a bottle grip 13 including a circumferential groove 13a constructed to be gripped by an arm of an automatic tool changer (not shown) disposed in the machine tool, and a shaft-like mount portion 14 to which the tool body 20 is mounted. Screwed into a first end portion of the tapered shank 12 is a pull stud 11, which is drawn in by a draw mechanism (not shown) inside of the spindle of the machine tool, thereby securing the tool holder 10 to the spindle of the machine tool.

The mount portion 14 includes a greater diameter portion 14b at a first end adjacent a second end of the tapered portion 12, and a smaller diameter portion 14a at a second end of portion 14. A step 15 having an end surface 15a is defined at a boundary portion between the small diameter portion 14a and the greater diameter portion 14b.

As seen in FIG. 1, the tool holder 10 is formed with a bolt through-hole 16 for receiving a bolt 31, or an element of the draw mechanism 30. Through-hole 16 extends from the first end of the tapered shank 12 to the second end of the mount portion 14. The bolt through-hole 16 comprises a bore of greater diameter 16a extending from the second end of the tapered shank 12 to some intermediate point in the greater diameter portion 14b of the mount portion 14. Bore 16a has a diameter so as to allow a head 31a of the bolt 31 to pass therethrough (See FIG. 4). Through-hole 16 also comprises a bore of smaller diameter 16b extending from a midpoint in the greater diameter portion 14b of the mount portion 14 to the second end of portion 14 at the end of smaller diameter portion 14a. Bore 16a has a diameter so as to allow a shank 31b of the bolt 31 to pass therethrough (See FIG. 4). At a boundary portion between the bore of greater diameter 16a and the bore of smaller diameter 16b, a step 17 is defined for locking the head 31a of the bolt 31 in position.

The second end surface of the smaller diameter portion 14a of the mount portion 14 is formed with six screw holes 18 around the bolt through-hole 16 (bore of smaller diameter 16b), as shown in FIG. 2, but these screw holes 18 are not used in the tool unit 1 of this embodiment.

Figure 3:
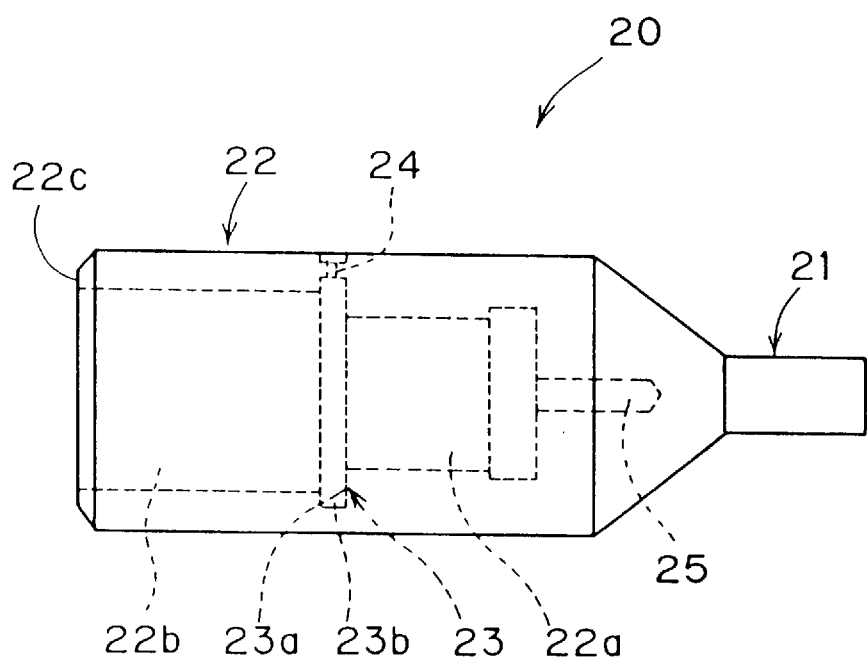
FIG. 3 is a top plan view showing a tool body according to the first embodiment of the invention.
Figure 4:
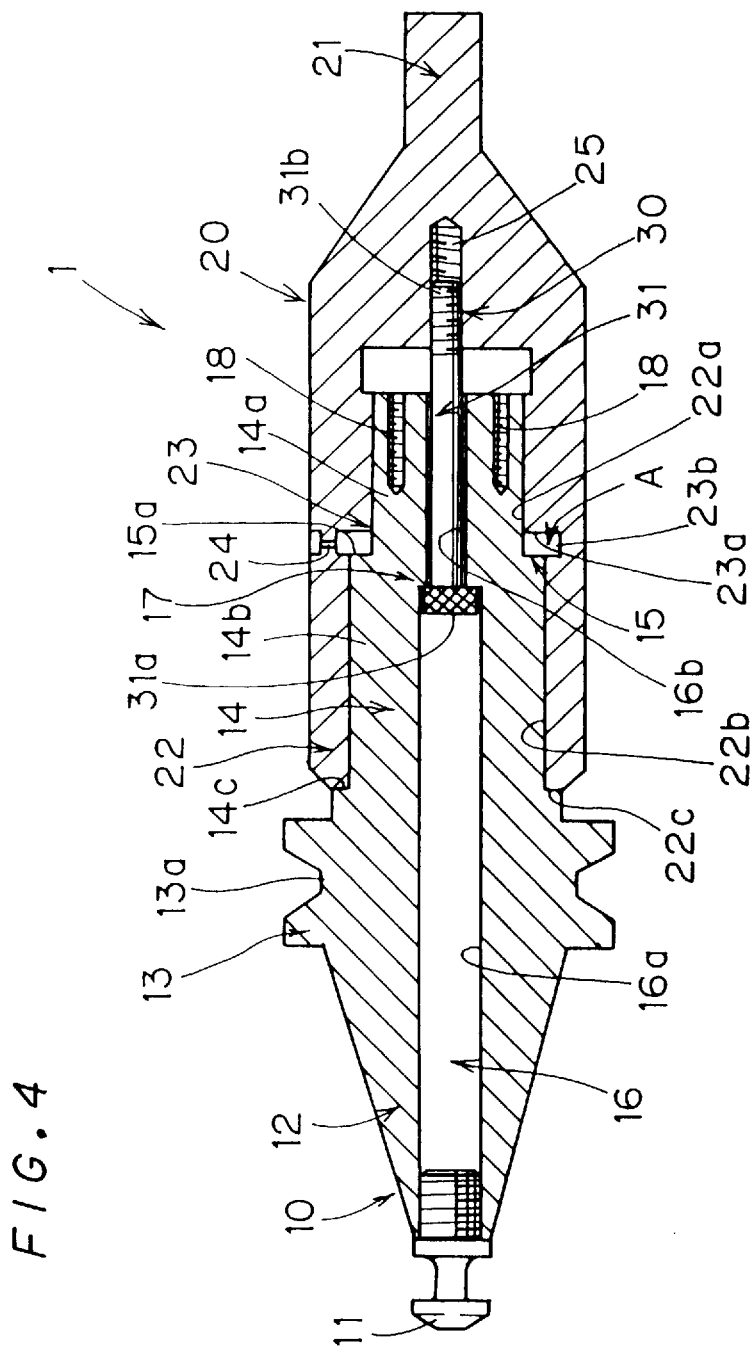
FIG. 4 is a sectional view showing a tool unit according to the first embodiment of the invention.

As seen in FIG. 3, the tool body 20 of the first embodiment comprises a grinding wheel of a small diameter 21 and a recessed fitting portion 22 constructed to be shrinkage-fitted on the mount portion 14 of the tool holder 10. The grinding wheel and the fitting portion 22 are formed in one piece. The fitting portion 22 has an inner diameter so constructed that the fitting portion 22 is tightly shrinkage-fitted on the mount portion 14 of the tool holder 10.

The fitting portion 22 includes a first fitting bore 22a constructed to be fitted on the small diameter portion 14a of the mount portion 14, a second fitting bore 22b constructed to be fitted on the great diameter portion 14b of the mount portion 14, and a step 23 having an end surface 23a. Step 23 is defined at a boundary portion between the first fitting bore 22a and the second fitting bore 22b. The fitting portion 22 further includes a circumferential groove 23b formed in the step 23 on the side of the second fitting bore 22b. A hydraulic feed passage 24 communicates between the circumferential groove 23b and the outside.

Extending from an internal surface of the first fitting bore 22a is a screw hole 25 into which the bolt 31 is screwed. The draw mechanism 30 is comprised of the screw hole 25, the bolt 31 and the step 17 of the bolt through-hole 16 for locking the head 31a of the bolt 31 in position.

The step 23 of the fitting portion 22 and the step 15 of the mount portion 14 are so positioned as to define a predetermined gap therebetween when the fitting portion 22 is fitted on the mount portion 14 and an end surface 22c of the fitting portion 22 is abutted against an end surface 14c of the mount portion 14.

In the tool unit 1 of the above configuration, the tool body 20 is mounted to the tool holder 10 in the following steps. First, the fitting portion 22 of the tool body 20 is heated to about 140° to 150° C. to cause expansion of the first and second fitting bores 22a and 22b. In the heated state, the mount portion 14 of the tool holder 10 is pressed into the fitting portion 22. At this time, the end surface 14c of the tool holder 10 abuts against the end surface 22c of the fitting portion 22 of the tool body 20 for regulation of a degree of fitting of the fitting portion 22 relative to the mount portion 14. A predetermined gap A (See FIG. 4) is thus defined between the step 15 of the mount portion 14 and the step 23 of the fitting portion 22 (including the circumferential groove 23b). Subsequently, the fitting portion 22 is cooled (or allowed to cool) whereby the first and second fitting bores 22a and 22b contract and, thus, the fitting portion 22 of the tool body 20 is preliminarily fitted on the mount portion 14 of the tool body 10.

Specifically, merely shrinkage-fitting the fitting portion 22 on the mount portion 14 creates a risk that the fitting portion 22 may be fitted on the mount portion 14 inclined relative to the mount portion 14, or axially displaced relatively to the mount portion, because of axial thermal contraction of the fitting portion 22 caused by cooling, or the like.

Accordingly, the bolt 31 is screwed in the screw hole 25 formed in the tool body 20 for biasing the tool holder 10 and the tool body 20 close to one another. In this state, an external hydraulic feed unit (not shown) supplies a high pressure oil to the gap A through the hydraulic feed passage 24 of the fitting portion 22 so that a thin layer of high pressure oil is formed between fitting surfaces of the mount portion 14 and the fitting portion 22. The high pressure oil layer acts as a lubricant for facilitating sliding movement of the fitting portion 22 relative to the mount portion 14. Thus, axial displacement as well as inclination of the fitting portion 22 relative to the mount portion 14 can be corrected with the end surface 22c and the end surface 14c in tight abutment. By such a simple operation, the tool body 20 is mounted to the tool holder 10 with a high degree of precision and thus a rigid tool unit 1 is provided while minimizing the possibility of the tool running out.

In the tool unit 1, with the tool body 20 thus mounted to the tool holder 10, the bolt 31 is firstly removed from the screw hole 25 in the tool body 20. In this state, high pressure oil is externally fed to the gap A via the hydraulic feed passage 24 of the fitting portion 22. The high-pressure oil forms a thin layer between the fitting surfaces of the mount portion 14 arid fitting portion 22 and also acts to push the end surfaces 15a and 23a of the steps 15 and 23 in opposite directions relative to each other, thus allowing the tool body 20 to be readily dismounted from the tool holder 10.

Figure 5:
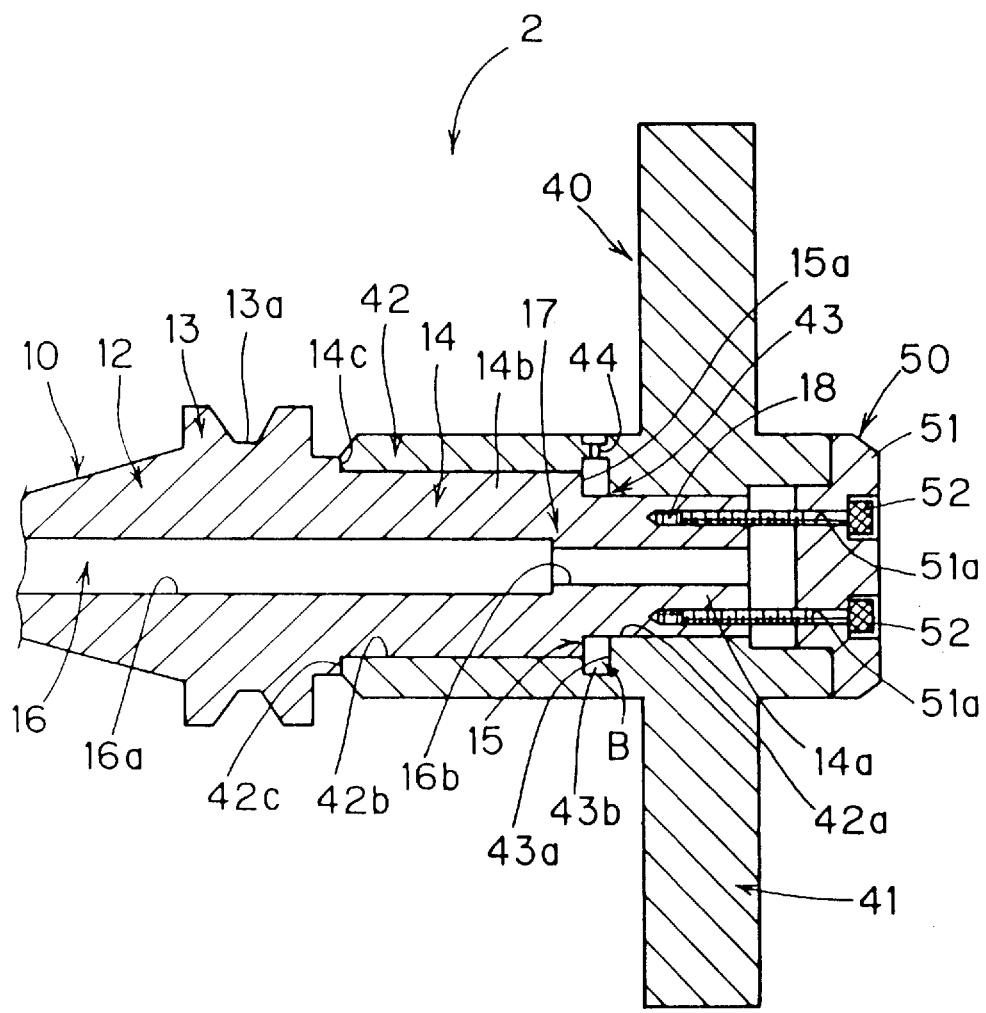
FIG. 5 is a sectional view showing a tool unit according to a second embodiment of the invention.

FIG. 5 illustrates a second embodiment of the invention. A tool unit 2 comprises the tool holder 10 of the foregoing embodiment and a tool body 40 of a different configuration mounted thereto. Accordingly, the description on the tool holder 10, which is identical to the embodiment of FIGS. 1–4, is omitted and the tool body 40 arid a draw mechanism 50, which are different elements from the prior embodiment, will be described in detail.

As seen in FIG. 5, the tool body 40 comprises a grinding wheel 41 of a relatively large diameter and a cylindrical fitting portion 42 shrinkage-fitted on the mount portion 14 of the tool holder 10. The grinding wheel and the fitting portion are formed in one piece. The fitting portion 42 has an inner diameter constructed to be tightly shrinkage-fitted on the mount portion 14 of the tool holder 10.

Just as in the tool body 20, the fitting portion 42 includes a first fitting bore 42a constructed to be fitted on the smaller diameter portion 14a of the mount portion 14, a second fitting bore 42b constructed to be fitted on the greater diameter portion 14b of the mount portion 14, and a step 43 having an end surface 43a. Surface 43a is defined at a boundary portion between the first and second fitting bores 42a and 42b. The fitting portion 42 also includes a circumferential groove 43b formed in the step 43 on the side of the second fitting bore 42b. A hydraulic feed passage 44 communicates between the circumferential groove 43b and the outside.

The end surface 42c of the fitting portion 14 abuts against the end surface 14c of the mount portion 14 for regulating a degree of fitting of the fitting portion 42 relative to the mount portion 14.

The draw mechanism 50 has an abutment member 51 fitted in the tool body 40 and abutted against an open end surface of the cylindrical fitting portion 42. The abutment member 51 includes six bolt through holes 51a corresponding to the screw holes 18 formed in the end surface of the mount portion 14 of the tool holder 10. Six bolts 52 passing through the six bolt through holes 51a are screwed into the six screw holes 18 in the mount portion 14 of the tool holder 10, thereby drawing the tool body 40 and the tool holder 10 close to each other. While six bolts and through holes are provided in this embodiment, other embodiments of the drawing mechanism with one or more bolts are contemplated.

Similarly to the aforesaid tool unit 1, the tool unit 2 of the above configuration offers the following advantages. More specifically, the fitting portion 42 of the tool body 40 is shrinkage-fitted on the mount portion 14 of the tool holder 10 and subsequently, high-pressure oil is externally fed through the hydraulic feed passage 44 to a predetermined gap B defined between the step 15 of the mount portion 14 and the step 43 of the fitting portion 40 (including the circumferential groove 43b). Thus, a thin layer of the high-pressure oil is formed between the fitting surfaces of the mount portion 14 and the fitting portion 42, while, on the other hand, the tool holder 10 and the tool body 40 are drawn close to each other by means of the draw mechanism 50. This arrangement facilitates the correction of inclination or axial displacement of the fitting portion 42 which may occur during the shrinkage-fit process.

In this embodiment of the tool unit 2 with the tool body 41 already mounted to the tool holder 10, the tool body 40 may be readily dismounted from the tool holder 10 by feeding high-pressure oil to the gap B via the hydraulic feed passage 44, just like the embodiment of tool unit 1.

Although the tool unit 2 comprises the abutment member 51 and the tool body 40 as separate members, the abutment member 51 may also be integrally formed with the fitting portion 42 of the tool body 40.

Figure 6:
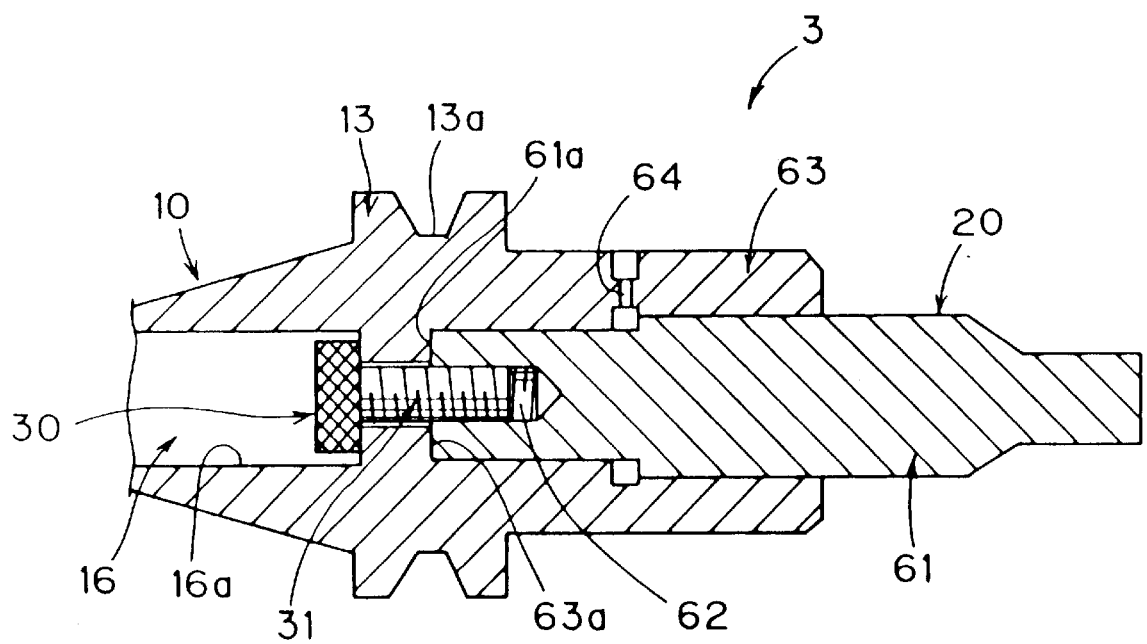
FIG. 6 is a sectional view showing a tool unit according to a third embodiment of the invention.

FIG. 6 depicts a third embodiment of the invention. The aforesaid tool unit 1 is arranged such that the tool holder 10 includes the shaft-like mount portion 14 while the tool body 20 includes the recessed fitting portion 22. In contrast, in the embodiment of FIG. 6 a tool unit 3 is arranged such that the tool body 20 includes a shaft-like mount portion 61 with a step instead of the recessed fitting portion 22 whereas the tool holder 10 includes a recessed fitting portion 63 with a step instead of the shaft-like mount portion 14. Thus, the tool body 20 may be mounted to the tool holder 10 by shrinkage-fitting the mount portion 61 of the tool body 20 in the fitting portion 63. In the tool unit 3, an end surface 61a of the mount portion 61 and an end surface 63a of the fitting portion 63 are abutted for regulating a degree of fitting of the mount portion 61 relative to the fitting portion 63.

As it is apparent from the figure and to those skilled in the art, this configuration requires a hydraulic feed passage 64 to be formed in the fitting portion 63 of the tool holder 10. A screw hole 62 is formed in an end surface of the mount portion 61 of the tool body 20. A bolt 31 of the draw mechanism 30 is screwed in hole 62 to draw tool 20 and tool holder 10 together. Mounting/dismounting of the tool body 20 to/from the tool holder 10 may be carried out in a manner similar to that of tool unit 1 of FIGS. 1–4.

Figure 7:
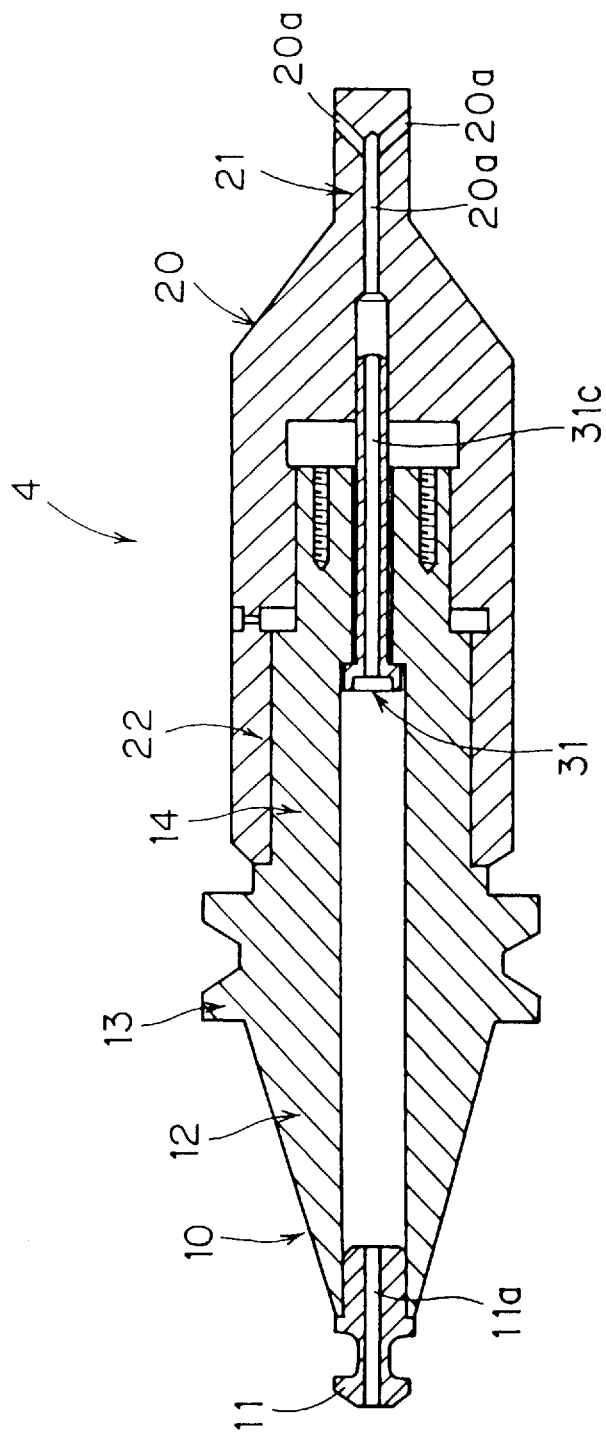
FIG. 7 is a sectional view showing a tool unit according to a fourth embodiment of the invention.
Figure 8:
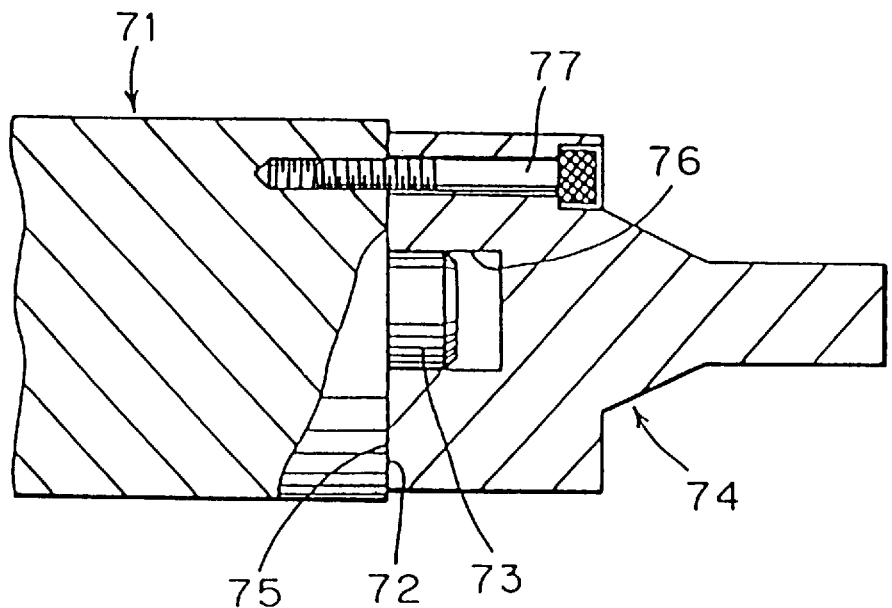
FIG. 8 is a sectional view showing a configuration of the background art.
Figure 9:
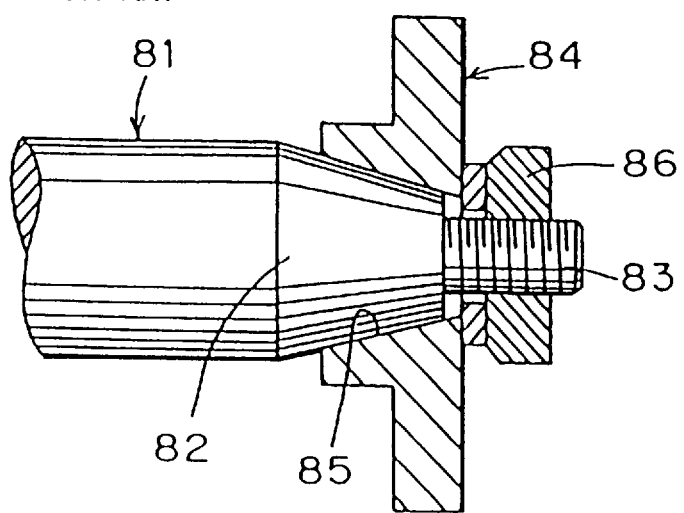
FIG. 9 is a sectional view showing another configuration of the background art.

FIG. 7 illustrates a tool unit 4 according to a fourth embodiment of the invention. As seen in FIG. 7, the tool unit 4 further comprises coolant feed bores 11a, 31c and 20a formed in the pull stud 11, the bolt 31 and the tool body 20 of the tool unit 1, respectively. The provision of the coolant feed bores 11a, 31c and 20a ensures the adaptability of the tool unit 1 to machine tool utilizing a through-spindle coolant system. Although not specifically illustrated in FIG. 6, the tool unit 3 may further include such coolant feed bores as appropriate, thereby allowing use with a through-spindle coolant system.

The foregoing examples are described by way of example with grinding tools, such as grinding wheels. One of skill in the art will recognize that the tool units of the invention are applicable to cutting tools such as end mills or other rotating tools.

In the foregoing embodiments, the fitting portions 22 and 42 are formed with the circumferential grooves 23b and 43b, respectively. But the invention also includes embodiments in which grooves are not provided.

In the aforesaid tool units 1 and 2, the tool holder 10 is formed with both the bolt through hole 16 and the screw holes 18, either of which may be utilized according to a configuration of the tool body, whereby the tool units 1 and 2 are adaptable to tool bodies 20 and 40 of various configurations. Instead, the tool holder may be formed with either the bolt through hole 16 or the screw holes 18 such that the tool holder may be dedicated to a particular configuration of tool body.

As described above, the tool units of the invention adopt the shrinkage-fit method for mounting the tool body to the tool holder with a high degree of precision. In addition, the invention provides for easy correction of inclination and axial displacement of the tool body relative to the tool holder, which are associated with shrinkage-fit. Therefore, the tool units of the present invention provide a run-out precision and clamp rigidity equivalent to those achieved by a tool unit in which the tool holder and tool body are integrally formed. Hence, the tool units of the invention may be advantageously applied to CBN tools rotating at extremely high speeds for machining workpieces or to electro-deposition grinders having a layer of abrasive grains too thin to allow correction of the run-out of the tools by truing.

Furthermore, the tool units of the invention provide easy mounting/dismounting of the tool body to/from the tool holder. The tool units of the invention accomplish a significant reduction of the overall production costs and the cost for replacing tool bodies, as compared to tool units wherein the tool holders and the tool bodies are integrally formed.

While the present invention has been illustrated by means of certain preferred embodiments, one of skill in the art will recognize that substitutions, modifications and inprovements can be made while remaining within the scope and spirit of the invention. The scope of the invention is determined solely by the appended claims.

Figure 10:
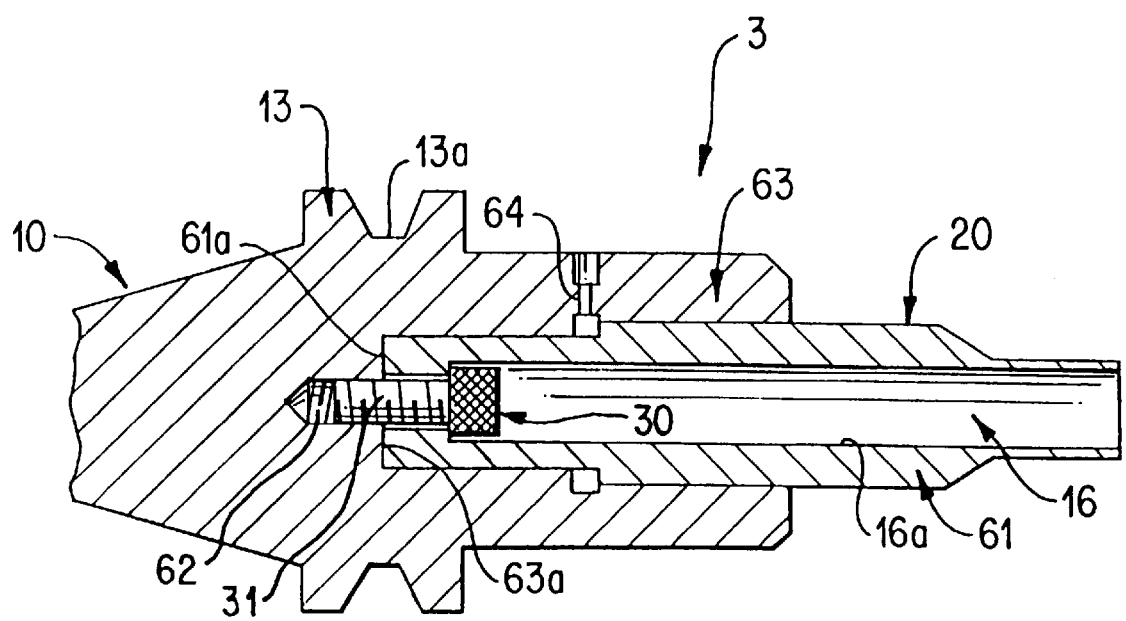
FIG. 10 is a sectional view showing a tool unit according to a third embodiment of the invention in which the drawing mechanism is inverted with respect to that shown in FIG. 6.

Specifically, it will be recognized that the tool holder may be fit onto the tool body and vice versa and that the drawing mechanism can draw the tool holder to the tool body or vice versa (Compare FIGS. 6 and 10).

I claim:

1. A tool unit comprising:
    a tool holder including a smaller diameter portion, a larger diameter portion adjacent the smaller diameter portion, and a step between the larger and smaller portions,
    a tool body removably mountable to said tool holder and including a smaller diameter portion constructed to engage the smaller diameter portion of the tool holder, a larger diameter portion for engagement with the larger diameter portion of the tool holder, and a step defined between the smaller and larger diameter portion of the tool body, and
    a draw mechanism to reversably draw the tool holder and tool body together,
    wherein a predetermined gap is defined between the step defined on tool holder and the step defined on the tool body when the tool body is mounted on the tool holder, and
    a hydraulic feed passage intercommunicating the predetermined gap and an outside of the tool unit.

2. A tool unit as set forth in claim 1 wherein one of the tool unit and the tool body is removably shrinkage fit on the other.

3. A tool unit comprising:
    a tool holder having a first end engagable with a machine tool, a second end, a mounting portion including a smaller diameter portion at the second end of the holder, a larger diameter portion adjacent the smaller diameter portion and between the first and second ends of the holder, and a step between the larger diameter and smaller diameter portions,
    a tool body removably mountable to said tool holder and including a smaller diameter bore engagable with the smaller diameter portion of the tool holder, a larger diameter bore engagable with the larger diameter portion of the tool holder, and a step defined between the smaller and larger diameter bores of the tool body, and
    a draw mechanism to reversably draw the tool holder and tool body together,
    wherein a predetermined gap is defined between the step defined on tool holder and the step defined on the tool body when the tool body is mounted on the tool holder, and
    a hydraulic feed passage intercommunicating the predetermined gap and an outside of the tool unit.

4. A tool unit as set forth in claim 3, wherein the tool body is removably shrinkage fit to said tool holder.

5. A tool unit as set forth in claim 4, wherein the predetermined gap comprises a circumferential groove defined in the tool holder.

6. A tool unit as set forth in claim 4, wherein said draw mechanism comprises a through hole passing through said tool holder and having a step, a threaded hole in said tool body, and a bolt having an end threadable into the threaded hole and a head lockable at the step in the through-hole.

7. A tool unit as set forth in claim 6, further comprising a coolant feed bore passing through said tool holder and emerging from said tool body.

8. A tool unit as set forth in claim 7, wherein said coolant feed bore also passes through said bolt.

9. A tool unit as set forth in claim 4, wherein said draw mechanism comprises a through hole passing through said tool body and having a step, a threaded hole in said tool holder, and a bolt having an end threadable into the threaded hole and a head lockable at the step in the through-hole.

10. A tool unit as set forth in claim 9, further comprising a coolant feed bore passing through said tool holder and emerging from said tool body.

11. A tool unit as set forth in claim 4, wherein said tool body has an open end opposite said larger diameter bore, and wherein said draw mechanism comprises:
- an abutment member abutted against and closing said open end and having a hole therein,
- a threaded hole in the tool holder, and
- a bolt having an end passable through said abutment member and threadable into the threaded hole to draw the tool holder and tool body together.

12. A tool unit as set forth in claim 11, further comprising a coolant feed bore passing through said tool holder and emerging from said tool body.

13. A tool unit comprising:
- a tool holder having a first end engagable with a machine tool, an axial bore having a smaller diameter portion proximal to the first end of the tool holder, a larger diameter portion between a second end of the tool holder and the smaller diameter portion, and a step between the larger diameter and smaller diameter portions,
- a tool body removably mountable to said tool holder and including a smaller diameter portion engagable with the smaller diameter portion of the axial bore of tool holder, a larger diameter portion engagable with the larger diameter portion of the axial bore of tool holder, and a step defined between the smaller and larger diameter portions of the tool body, and
- a draw mechanism to reversably draw the tool holder and tool body together,
- wherein a predetermined gap is defined between the step defined on tool holder and the step defined on the tool body when the tool body is mounted on the tool holder, and
- a hydraulic feed passage is provided intercommunicating the predetermined gap and an outside of the tool unit.

14. A tool unit according to claim 13, wherein said tool holder is removably shrinkage fit to said tool body.

15. A tool unit according to claim 14, wherein said gap comprises a circumferential groove defined in said tool holder.

16. A tool unit as set forth in claim 14, wherein said draw mechanism comprises a through hole passing through said tool holder and having a step, a threaded hole in said tool body, and a bolt having an end threadable into the threaded hole and a head lockable at the step in the through-hole.

17. A tool unit as set forth in claim 16, further comprising a coolant feed bore passing through said tool holder and emerging from said tool body.

18. A tool unit as set forth in claim 17, wherein said coolant feed bore also passes through said bolt.

19. A tool unit as set forth in claim 14, wherein said draw mechanism comprises a through hole passing through said tool body and having a step, a threaded hole in said tool holder, and a bolt having an end threadable into the threaded hole and a head lockable at the step in the through hole.

20. A tool unit as set forth in claim 19, further comprising a coolant feed bore passing through said tool holder and emerging from said tool body.

* * * * *